A. F. BREITENSTEIN.
DIE HEAD FOR CUTTING TAPER AND STRAIGHT THREADS.
APPLICATION FILED JULY 2, 1920.
1,396,989.
Patented Nov. 15, 1921.
2 SHEETS—SHEET 1.
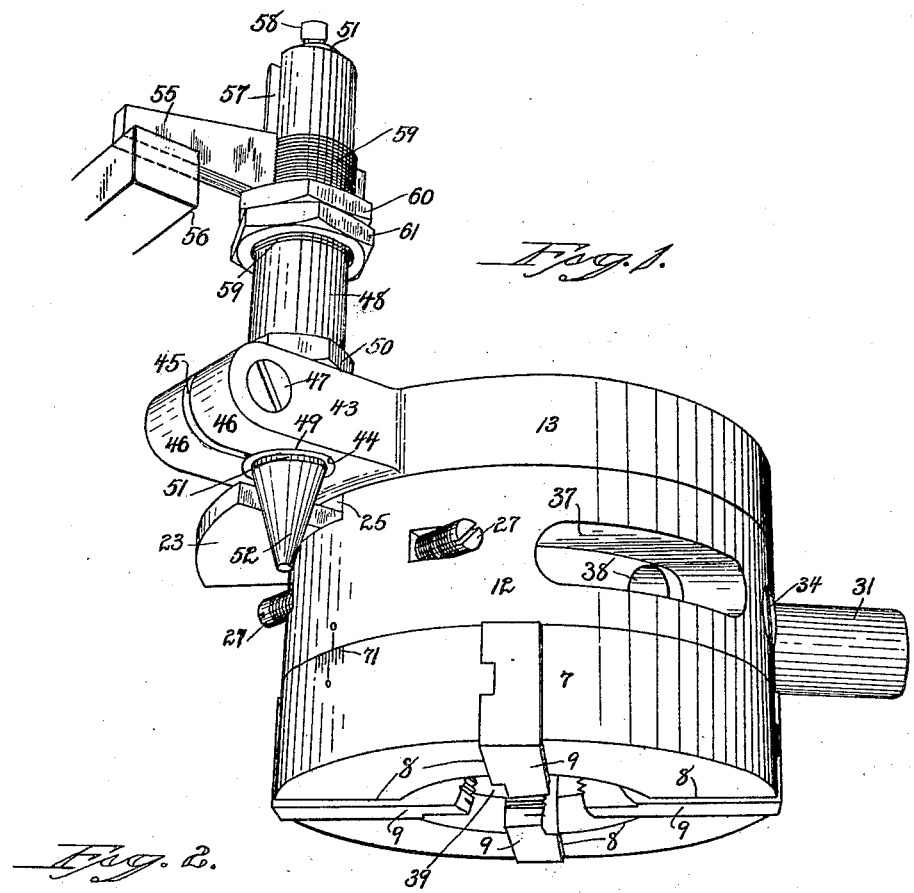
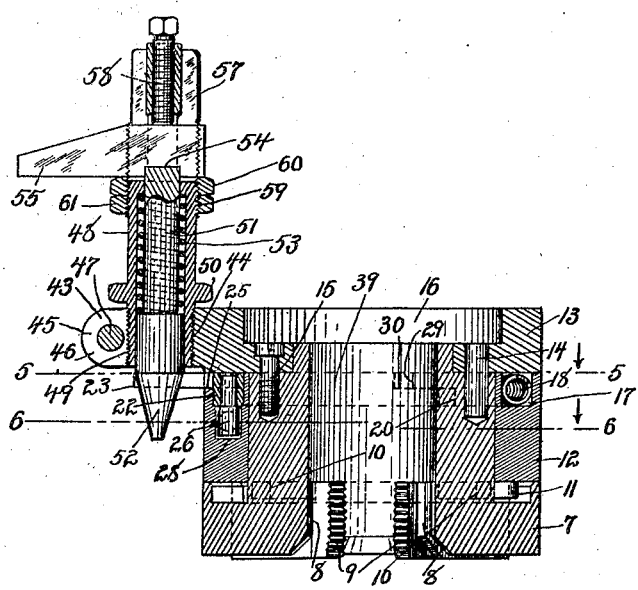
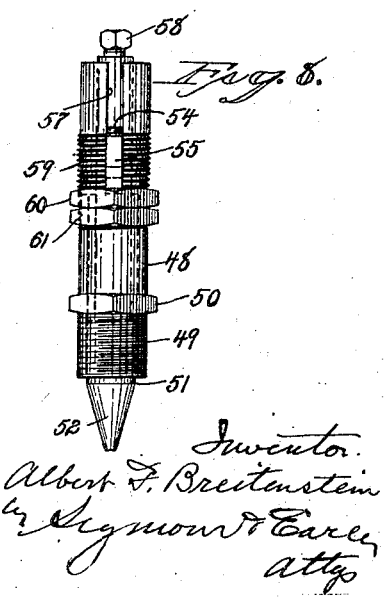

A. F. BREITENSTEIN.
DIE HEAD FOR CUTTING TAPER AND STRAIGHT THREADS.
APPLICATION FILED JULY 2, 1920.
1,396,989.
Patented Nov. 15, 1921.
2 SHEETS—SHEET 2.
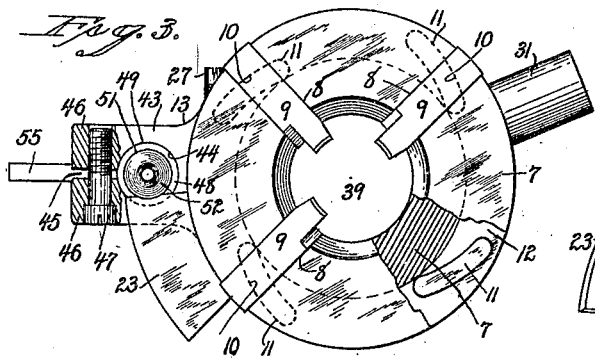
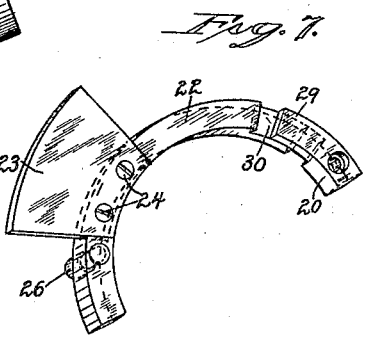
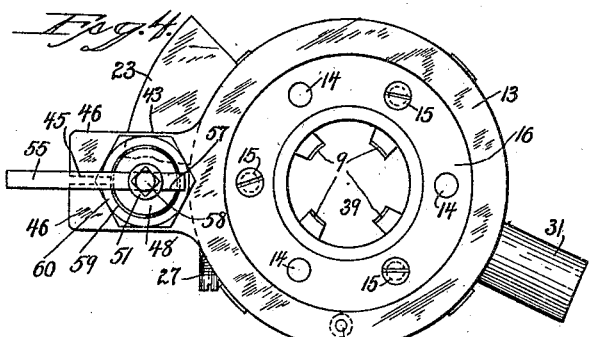
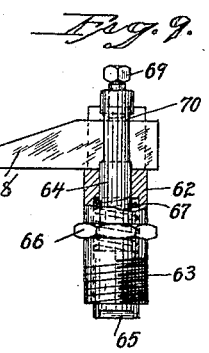
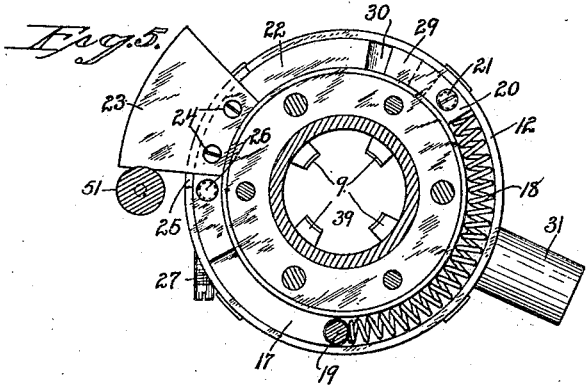
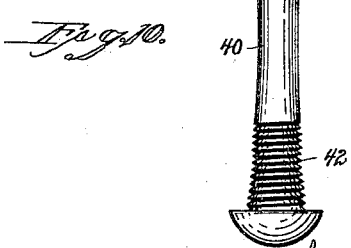

UNITED STATES PATENT OFFICE.

ALBERT F. BREITENSTEIN, OF NEW HAVEN, CONNECTICUT, ASSIGNOR TO THE GEOMETRIC TOOL CO., OF NEW HAVEN, CONNECTICUT, A CORPORATION.

DIE-HEAD FOR CUTTING TAPER AND STRAIGHT THREADS.

1,396,989. Specification of Letters Patent. Patented Nov. 15, 1921.

Application filed July 2, 1920. Serial No. 393,587.

*To all whom it may concern:*

Be it known that I, ALBERT F. BREITENSTEIN, a citizen of the United States, residing at New Haven, in the county of New Haven and State of Connecticut, have invented a new and useful Improvement in Die-Heads for Cutting Taper and Straight Threads; and I do hereby declare the following, when taken in connection with the accompanying drawings and the characters of reference marked thereon, to be a full, clear, and exact description of the same, and which said drawings constitute part of this application and represent, in—

Figure 1, a perspective view of a die-head embodying my invention.

Fig. 2, a view thereof in vertical central section.

Fig. 3, a reverse plan view thereof, the split outer end of the arm of the carrier-plate being shown in section.

Fig. 4, a plan view thereof.

Fig. 5, a view thereof in transverse section on the line 5—5 of Fig. 2, with the carrier-plate removed.

Fig. 6, a view thereof in transverse section on the line 6—6 of Fig. 2.

Fig. 7, a detached perspective view of the segment with its extension and cleat.

Fig. 8, a detached view of the interchangeable taper-thread unit.

Fig. 9, a view partly in elevation and partly in section of the interchangeable straight-thread unit.

Fig. 10, a view of a taper-thread stay-bolt, as produced with my improved die-head.

My invention relates to an improvement in die-heads for cutting taper or straight threads as may be desired, being primarily designed for threading taper-thread or straight-thread stay-bolts, but not limited to such use. The object of my invention is to produce at a low cost for manufacture, a simple and efficient die-head constructed with particular reference to conversion for cutting straight or tapered threads without the expenditure of the time called for by the disassemblance of the device for effecting its conversion for cutting straight threads or taper threads, or vice versa.

With these ends in view, my invention consists in an automatic die-head having chasers and means for operating the same, in combination with separately organized, interchangeable, thread-controlling units adapted to be inserted into and removed from the die-head without disassembling the same. My invention further consists in certain details of construction as will be hereinafter described and pointed out in the claims.

In carrying out my invention, as herein shown, I construct a die-head, the general features of which are of standard type and consist of a skeleton body 7, the lower face of which is formed with four radial slots 8 for the reception of as many chasers 9 having their upper faces transversely slotted, as usual, as at 10, for the reception of tangentially arranged cam-lugs 11 formed upon the lower face of an oscillating cam-ring 12 which is mounted upon the body 7 and held in place thereupon by a circular carrier-plate 13 secured in place by three dowels 14 and three screws 15. It is to be understood, however, that the number of chasers may be varied as desired. The upper face of the plate 13 is formed with a large, concentric recess 16 by means of which the die-head is secured to the non-rotatable spindle of a stay-bolt machine in the usual manner, the die-head remaining stationary while the work is mounted in and rotated with any suitable chuck.

The upper edge of the cam-ring 12 is formed with a deep annular recess 17 which receives a helical spring 18 which throws the cam in the direction of opening the chasers. This spring abuts at one end upon a stud 19 (Fig. 5) depending from the plate 13, and at its opposite end against a segment-retaining cleat 20 located in the recess 17 and secured by a screw 21 to the cam-ring 12.

The recess 17 in the upper face of the cam-ring 12 also receives an oscillating segment 22 having a wedge-shaped extension 23 secured to it by screws 24, this extension projecting laterally outward beyond the periphery of the die-head through a slot 25 in the upper edge of the cam-ring, as shown in Fig. 1. The said segment 22 carries a depending coupling-stud 26, the lower end of which is interposed between the inner ends of two adjusting-screws 27 tangentially mounted in the cam-ring, as shown in Fig. 6, the said cam-ring being formed with a slot 28 for the downward projection into it of the said stud 26. The stud 26 couples the cam-ring 12 and the segment 22, while the adjusting-screws 27 provide for adjusting their relative relations so that the ring may be adjusted in position with reference to the chasers so as to operate the same in accordance with the desired diameter of the thread to be cut. The segment 22 is prevented from tilting by the provision of the cleat 20 with a tongue 29 which overhangs a corresponding tongue 30 upon the adjacent end of the segment.

As in standard automatic die-heads of the type being described, the chasers 12 are automatically retired after the completion of the cutting operation by means of the spring 18. The work having been removed, the chasers are again closed preparatory to another threading operation by means of a closing roller 31 journaled upon a stud 32 secured in the cam-ring by a pin 33, as shown in Fig. 6, this roller being acted upon at a predetermined time by an abutment in the stay-bolt machine. The throw of the cam-ring in the direction of opening is limited by a stop-screw 34 mounted in the ring and projecting into a slot 35 formed in the body 7 and receiving at one end a hardened stop-pin 36 against which the inner end of the screw 34 engages to limit the opening movement of the cam-ring.

As shown, the cam-ring 12 is formed with a long, concentric clearance-slot 37 leading into a radial tool-hole 38 formed in the body 7 and permitting a cutting-tool to be inserted into the bore 39 of the die-head so as to enable a stay-bolt to be turned down, as at 40, between its threaded portions 41 and 42, if desired, or to permit the work, whatever its character, to be turned down between its threaded ends.

I have thus far described my die-head as a self-contained, separately organized structure, in its main features, of standard type, this constituting the die-head unit of my improvement, but characterized as to novelty by its projecting segment-extension (Fig. 3) which is a new feature of automatic die-head construction. I will now proceed to describe two interchangeable thread-controlling units, such as are designed to be used with a die-head of the type described, Fig. 8 illustrating a taper-thread unit and Fig. 9, a straight-thread unit.

For the interchangeable reception of these thread-controlling units for the conversion of the die-head for cutting taper or straight threads, as desired, the carrier-plate 13 is formed with a radial arm 43 provided with a vertical threaded opening 44, the outer wall of which is intersected by a slot 45 splitting the outer end of the arm into clamping-lugs 46 drawn together by a locking-screw 47. The arm 43 is thus adapted to mount either one or the other of the threading units, as may be desired, without disassembling either of the units or disassembling the die-head proper.

The taper-thread unit (Fig. 8) consists of a tubular body 48 provided at its lower end with screw-threads 49 adapting it to be screwed into the threaded hole 44 in the arm 43 in which it is clamped by the screw 47, the body having an integral hexagon 50 for the application of a wrench by means of which the unit is screwed into and out of the arm 43. The tubular body 48 receives a plunger 51, the projecting lower end of which consists of a tapered head or cone 52 which coacts with the inclined forward edge of the wedge-shaped segment-extension 23, as shown in Fig. 1. The stem of the plunger 51 is surrounded by a helical spring 53 located within the tubular body 48 and exerting constant effort to force the plunger downward. At its upper end, the plunger is formed with a transverse slot 54 for the reception of a vertically adjustable tripping-finger 55 which co-acts with an abutment 56 (Fig. 1) indicated by broken lines and forming a feature of the stay-bolt machine. For the reception of the finger 55, the upper end of the tubular body is formed with a guide slot 57. The extreme upper end of the plunger is internally threaded for the reception of a set-screw 58 which impinges upon the upper edge of the finger 55 and holds the same rigidly in the slot 54 of the plunger. To provide for varying the length of the thread to be cut, the upper portion of the body is threaded, as at 59, for the reception of an adjusting-nut 60 and a lock-nut 61, these being located directly below the tripping-finger which bears upon them and which is raised or lowered as required by them.

As shown in Fig. 2 of the drawings, these nuts 60 and 61 are positioned so as to provide for the co-action of the full length of the tapered head 52 of the plunger with the segment extension 23. If it is desired, however, to shorten the length of the thread to be cut, the nuts are raised upon the threaded portion 59 of the tubular body 48, whereby the tripping-finger is lifted with the effect of lifting the tapered head 52 of the plunger 51 with respect to the segment-extension 23. The taper-thread unit thus described, is self-contained and is mounted in the arm 43 of the die-head for converting the same for cutting taper threads, without disassembling the die-head.

For cutting straight threads, I employ a separate straight-thread unit consisting of a tubular body 62 having its lower end threaded as at 63 for insertion into the threaded hole 44 of the arm 43 of the carrier-plate 13. The tubular body 62 receives a plunger 64 having its lower end cut transversely and slightly flattened, as at 65 for co-action with the forward edge of the segmental-extension 23. The said body 63 is furnished with integral wrench-faces 66 whereby the unit is screwed into and unscrewed from the arm 43. The plunger 64 is operated by a helical spring 67 located within the body and exerting a constant effort to force the plunger downward, the same as in the construction previously described. At its upper end, the plunger is transversely slotted for the reception of a tripping-finger 68 secured in place by a set-screw 69 and passing transversely through a slot 70 formed in the upper end of the body 62. No provision is made in this unit for adjusting the tripping-finger 68, but provision is made in the stay-bolt machine for adjusting the position of the abutment 56 as may be required. The straight-thread controlling unit of Fig. 9 converts the die-head for straight-thread cutting without disassembling the same.

It will thus be seen that by constructing the die-head and thread-controlling units as separate organizations, I am able to convert the die-head for taper-thread cutting or straight-thread cutting and vice versa without disassembling the die-head or in any way changing it. It will also be apparent that the operation of interchanging the thread-controlling units is easily effected.

Let it be assumed that the die-head is mounted upon the non-rotatable spindle of a standard stay-bolt machine and converted for taper-thread cutting by the mounting in it of the taper-thread controlling unit. Now, as the die-head descends with the spindle, the tripping-finger 55 of the unit engages at the beginning of the threading operation, with the upper face of the abutment 56 of the machine. This arrests the downward movement of the finger 55 and consequently begins the lifting of the plunger 51 and its cone 52 with respect to the inclined forward edge of the wedge-shaped segment-extension 23 which is held against it by the cam-spring 18. Therefore, as the cone 52 is lifted, it will ride over the edge of the extension, which will thus be allowed to turn under the influence of the spring, at a rate corresponding to the lifting of the cone. As the extension 23 turns, so does the segment 22 and hence the cam-ring 12 and the chasers 9. This low progressive turning of the cam-ring in the direction of opening, continues throughout the threading operation until finally when the cone 52 is lifted sufficiently for its lower end to clear the segment-extension 23, the cam-spring 18 operates to complete the opening movement of the cam-ring, whereby the chasers are thrown into their fully open positions, in which they automatically release the work being threaded. The die-head is now lifted into its starting position, at which time the closing roller 31 co-acts with its appropriate abutment upon the stay-bolt machine to force the cam-ring against the tension of its spring 18 into its fully closed position, at which time the segment 23 is carried so far beyond the cone 52 of the plunger 51 as to permit the spring 53 thereof to force it downward into its starting position, as shown by Fig. 1. The operation above described is then repeated.

By means of the adjusting-screws 27, the diameter of the thread may be varied, since they provide for adjusting the coupling between the cam-ring 12 and the oscillating segment 22. On the other hand, by adjusting the position of the tripping-finger 55 upon the tubular body 48 of the taper-thread controlling unit, the length of the thread cut may be varied as desired.

To convert the die-head for cutting straight threads, the taper-thread controlling unit of Fig. 8 is removed and replaced by the straight-thread controlling unit of Fig. 9. In using this unit, the abutment 56 is adjusted to co-act with the tripping-finger 68 at the moment it is desired to release the cam-ring for automatically opening the chasers, the tripping-finger simply descending through space until it is brought into engagement with the abutment. During the descent of the die-head with the spindle of the machine, the flattened, projecting, lower edge 65 of the plunger 64 remains in engagement with the forward edge of the extension 23. Then when the finger 68 engages with the abutment 56, the segment-extension 23 is released and the cam-ring allowed to move at once from its full closed to its full open position instead of gradually, as in the construction previously described.

As shown in Fig. 1, graduations 71 are placed upon the external faces of the body 7 and cam-ring 12 to guide the user in turning the adjusting-screws 27 as required for adjusting the projection 23 with reference to the cam-ring.

I claim:

1. In a die-head, the combination with a self-opening die-head unit, of an independently organized, thread-controlling unit adapted to be inserted into and removed from the die-head unit without disassembling the same, and having a yielding plunger retiring during the progress of the work and returning to its initial position after the completion of the work.

2. In a convertible die-head, the combination with a die-head unit, of an independently organized, thread-controlling unit for insertion into and removal from the die-head unit without disassembling the same, the said unit having a spring-actuated plunger formed with a tapering head co-acting with an abutment external to the die-head.

3. A die-head unit having a body, chasers mounted therein, a cam-ring for operating the chasers, a projection connected with the cam-ring and projecting from the die-head, and a removable thread-controlling unit mounted upon the die-head in position to co-act with the said projection and having a tripping-finger co-acting with an external abutment.

4. A die-head having a body, chasers mounted therein, a cam-ring for operating the chasers, a projection adjustably connected with the cam-ring, a plate secured to the said body, and an independently organized, removable, thread-controlling unit adapted to be mounted in the plate in position to co-act with the said projection and to be operated by an external abutment.

5. A die-head having a body, chasers mounted therein, a cam-ring for operating the chasers, a segment attached to the cam-ring and provided with a lateral projection, adjustable connection between the said segment and ring, a plate secured to the body, and an independently organized, removable, thread-controlling unit mounted in the said plate and having a plunger formed with a conical end for co-action with the said projection, and a tripping-finger for co-action with an external abutment.

6. In a die-head, the combination with a body, of chasers mounted therein, a spring-actuated cam-ring for operating the chasers, a segment mounted in the said ring, a wedge-shaped projection carried by the segment and projecting from the periphery of the die-head, means for adjustably connecting the segment and cam-ring, a carrier-plate secured to the said body, and a self-contained thread-controlling unit adapted to be removably mounted in the said plate and having a plunger for co-acting with the said projection, and adapted to be moved by means independent of the die-head.

7. A die-head having a body, chasers mounted therein, a cam-ring for operating the chasers, a segment attached to the cam-ring, a segment-extension projecting from the periphery of the die-head, a coupling-stud carried by the segment, screws mounted in the cam-ring and engaging with said stud for adjusting the position of the segment with reference to the ring, a plate secured to the body, and a separately organized thread-controlling unit removably mounted in the said plate and having a plunger adapted to co-act with the said segment-extension and with an abutment external to the die-head.

8. A die-head having a body, chasers mounted therein, a cam-ring for operating the chasers, a spring for turning the cam-ring to throw the chasers into their open positions, a segment carried by the cam-ring, a segment-extension, a coupling-stud carried by the segment, two screws mounted in the cam-ring and engaging with the said coupling-stud, whereby the segment-extension may be adjusted with relation to the cam-ring, a plate secured to the body, and a removable thread-controlling unit mounted in the said plate and comprising a plunger adapted to coöperate with the said extension and having an adjustable tripping-finger adapted to engage with an abutment independent of the die-head.

9. A die-head convertible for cutting taper and straight threads, having a die-head unit and an interchangeable thread-controlling unit adapted to be removably applied to the die-head and comprising a tubular body, a spring-actuated plunger mounted therein and adapted at its lower end to control the chasers of the die-head, and having an adjustable tripping-finger adapted to co-act with an abutment external to the die-head.

10. A thread-controlling unit for use with automatically opening die-heads, the said unit consisting of a tubular body having its upper end formed with a guide-slot, a spring-actuated plunger located in the said body and having its lower end adapted to co-act with the cutting mechanism of the die-head and having its upper end slotted and threaded, an adjusting-nut mounted upon the said body, and a tripping-finger passing through the slot of the plunger and body, held in place by the screw in the plunger, and resting upon the said nut by which it is adjusted in position with respect to the said body.

11. A die-head having a body, chasers mounted therein, a cam-ring for operating the chasers, a spring for turning the ring to retire the chasers, a projection connected with the ring and extending laterally from the die-head, a plate secured to the body and having an offsetting arm formed with a threaded opening, and a removable thread-controlling unit mounted in the opening of the said arm and having a spring-actuated plunger carrying a tripping-finger for co-action with an abutment external to the die-head, and formed at its lower end with a cone for co-action with the said projection, whereby the ring is turned in the direction of opening the chasers, at a speed corresponding to the taper of the cone.

In testimony whereof I have signed this specification in the presence of two subscribing witnesses.

ALBERT F. BREITENSTEIN.

Witnesses:
EDITH M. BUCKBEE,
MARION E. THOMAS.